United States Patent
Nakatsukasa et al.

(10) Patent No.: US 11,016,054 B2
(45) Date of Patent: May 25, 2021

(54) GAS SENSOR ELEMENT AND GAS SENSOR INCLUDING SAME

(71) Applicant: NGK SPARK PLUG CO. LTD., Nagoya (JP)

(72) Inventors: Takuya Nakatsukasa, Nagoya (JP); Masaki Mizutani, Nagoya (JP)

(73) Assignee: NGK SPARK PLUG CO. LTD., Aichi (JP)

( * ) Notice: Subject to any disclaimer, the term of this patent is extended or adjusted under 35 U.S.C. 154(b) by 134 days.

(21) Appl. No.: 16/274,362

(22) Filed: Feb. 13, 2019

(65) Prior Publication Data
US 2019/0250122 A1 Aug. 15, 2019

(30) Foreign Application Priority Data

Feb. 14, 2018 (JP) .............................. JP2018-024034

(51) Int. Cl.
| G01N 27/407 | (2006.01) |
| G01N 27/419 | (2006.01) |
| C04B 35/488 | (2006.01) |
| C04B 35/44 | (2006.01) |

(52) U.S. Cl.
CPC ..... *G01N 27/4077* (2013.01); *G01N 27/4071* (2013.01); *G01N 27/419* (2013.01); *C04B 35/44* (2013.01); *C04B 35/488* (2013.01); *G01N 27/4073* (2013.01)

(58) Field of Classification Search
None
See application file for complete search history.

(56) References Cited

U.S. PATENT DOCUMENTS

| 4,824,548 | A | * | 4/1989 | Iino | .................... | G01N 27/4065 204/406 |
| 2009/0084673 | A1 | * | 4/2009 | Ogata | .................... | B82Y 30/00 204/243.1 |
| 2014/0190828 | A1 | * | 7/2014 | Kamada | ............. | G01N 27/4078 204/427 |
| 2016/0091457 | A1 | * | 3/2016 | Konno | ............... | G01N 27/4071 204/427 |

FOREIGN PATENT DOCUMENTS

JP 2016-080684 A 5/2016

\* cited by examiner

*Primary Examiner* — J. Christopher Ball
(74) *Attorney, Agent, or Firm* — Sughrue Mion, PLLC (57) ABSTRACT

A gas sensor element including: a first ceramic layer (300) including a solid electrolyte (320); a pair of electrode portions (330) and (333) at least partially disposed on opposing surfaces of the solid electrolyte; a support member (341) surrounding a part of an outer peripheral edge of at least one electrode portion (330) of the pair of electrode portions and having a notch (341N), a part of the electrode portion extending in the notch; and a second ceramic layer (242) disposed on a side where the at least one electrode portion (330) is present, so as to be in contact with a surface of the support member, the gas sensor element being obtained by stacking the first ceramic layer (300), the support member (341) and the second ceramic layer (242), wherein the second ceramic layer covers at least a part of the notch.

8 Claims, 8 Drawing Sheets

GAS SENSOR ELEMENT AND GAS SENSOR INCLUDING SAME

BACKGROUND OF THE INVENTION

1. Field of the Invention

The present invention relates to a gas sensor element and a gas sensor including the same.

2. Description of the Related Art

Conventionally, gas sensors have been used for measuring the concentrations of specific gas components in exhaust gas from internal combustion engines. As such gas sensors, a gas sensor having a structure including a stacked type gas sensor element obtained by stacking a plurality of elongated plate-shaped ceramic layers (e.g., solid electrolytes and alumina substrates), has been known.

Figure 9:
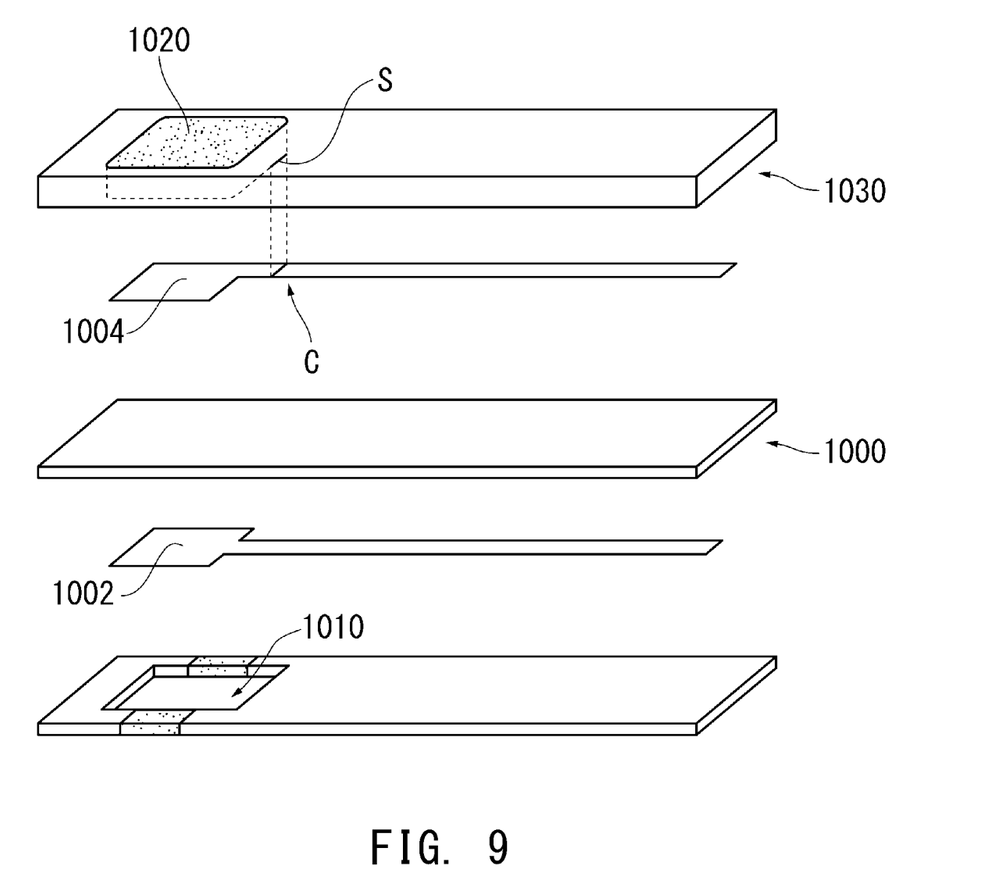
FIG. 9 is a partial exploded perspective view of a conventional gas sensor element.

An example of a known sensor element is shown in FIG. 9, which includes an oxygen pump cell having a solid electrolyte layer 1000 and having a pair of electrodes 1002 and 1004 provided on opposite surfaces of the solid electrolyte layer. Oxygen is pumped into or out of a measurement chamber 1010 in a state in which the inner electrode 1002 faces the measurement chamber 1010. This configuration allows a measurement target gas to be introduced into the measurement chamber 1010, and the outer electrode 1004 communicates with the outside via a porous layer 1020.

In addition, a technique in which the ventilation volume of gas having reached the outer electrode 1004 via the porous layer 1020 is controlled in a state where the outer peripheral edge of the outer electrode 1004 and the outer peripheral edge of the porous layer 1020 are superposed on each other, is also disclosed (e.g., see Patent Document 1).

[Patent Document 1] Japanese Patent Application Laid-Open (kokai) No. 2016-80684 (FIG. 2 and FIG. 5)

3. Problems to be Solved by the Invention

Incidentally, when the above-described stacked type sensor element is manufactured, a conductive paste layer which becomes the outer electrode 1004 is formed in advance on a surface of the solid electrolyte layer 1000, and a porous paste layer which becomes the porous layer 1020 is formed in advance on an insulation layer 1030. Then, the solid electrolyte layer 1000 and the insulation layer 1030 are stacked such that the conductive paste layer and the porous paste layer oppose each other. Also, on the reverse surface side of the solid electrolyte layer 1000, a heater layer and the like are stacked. Then, the entirety of the resultant stacked body is baked, to thereby complete the sensor element.

However, when the porous paste layer is formed on the insulation layer 1030, the outer peripheral edge of the porous paste layer stepwise projects from the surface of the insulation layer 1030 by the thickness of the paste layer. If the solid electrolyte layer 1000 and the insulation layer 1030 are stacked in this state, there is a risk that the conductive paste layer which is relatively soft is cut as a result of being crushed and stretched by a step portion S of the outer peripheral edge of the porous paste layer. The outer electrode thus obtained can become disconnected at a portion C thereof.

SUMMARY OF THE INVENTION

Thus, an object of the present invention is to provide: a gas sensor element which inhibits an electrode portion disposed on a surface of a solid electrolyte from becoming disconnected during manufacturing; and a gas sensor including the same.

The above object of the invention has been achieved by providing (1) a gas sensor element comprising: a first ceramic layer including a solid electrolyte; a pair of electrode portions at least partially disposed on opposing surfaces of the solid electrolyte; a support member surrounding a part of an outer peripheral edge of at least one electrode portion of the pair of electrode portions and having a notch, a part of the electrode portion extending in the notch; and a second ceramic layer disposed on a side where the at least one electrode portion is present, so as to be in contact with a surface of the support member, the gas sensor element being obtained by stacking the first ceramic layer, the support member, and the second ceramic layer, wherein the second ceramic layer covers at least a part of the notch.

According to the gas sensor element (1), the electrode portion is surrounded by the support member, and a part of the electrode portion extends in the notch provided in the support member. Thus, when the first ceramic layer and the second ceramic layer are stacked during manufacturing, the notch provides an obstruction to thereby inhibit the electrode portion in the notch from becoming crushed and disconnected.

In the preferred embodiment (2) of the gas sensor element (1), the second ceramic layer includes a diffusion rate limiting layer, and the notch is provided so as to avoid the diffusion rate limiting layer.

For the diffusion rate limiting layer, a green-sheet-like hard material is sometimes used. In this case, the diffusion rate limiting layer is harder than another member, of the second ceramic layer, which is formed from an insulative paste or the like. Therefore, by providing the notch so as to avoid the diffusion rate limiting layer (so as to be located on the side where the other softer member, of the second ceramic layer, is present), the electrode portion in the notch becomes less likely to be crushed, and thus can further inhibit the electrode portion from becoming disconnected.

In another preferred embodiment (3) of the gas sensor element (1) or (2) above, the first ceramic layer is formed by disposing the solid electrolyte in a through hole provided in a plate-shaped insulation layer; a lead portion which is denser than the electrode portion is electrically connected to each electrode portion; and a connection portion between the electrode portion and the lead portion is disposed outward of an outer peripheral edge of the solid electrolyte.

The lead portion which is denser than the electrode portion is different from the electrode portion in terms of an electrode reaction with the solid electrolyte. Thus, if the connection portion is disposed on the surface of the solid electrolyte, the electrode reaction between the electrode portion and the solid electrolyte is affected. Therefore, the connection portion is preferably disposed outward of the solid electrolyte.

In yet another preferred embodiment (4) of the gas sensor element of any of (1) to (3) above, the support member contains zirconia as a main material.

According to the gas sensor element (4), the support member has the characteristic of a solid electrolyte. Thus, as compared to a case where the support member is formed from an insulative material, it is possible to secure a wider area of a portion that functions as the electrode portion.

In a second aspect (5), the present invention provides a gas sensor comprising the gas sensor element of any of (1) to (4) above.

Effects of the Invention

According to the present invention, a gas sensor element and gas sensor including the same are obtained, having a configuration which inhibits the electrode portion disposed on the surface of the solid electrolyte from becoming disconnected during manufacture.

DESCRIPTION OF REFERENCE NUMERALS

Reference numerals used to identify various features in the drawings include the following.
200: gas sensor
210: gas sensor element
242, 247: second ceramic layer
247: diffusion rate limiting layer
300: first ceramic layer
310: insulation layer
320: solid electrolyte
330, 333 (331, 332), 430, 530: pair of electrode portions
330L: lead portion
341, 342, 441, 541: support member
341N, 441N, 541N: cut
CL: axial line
J: connection portion

DETAILED DESCRIPTION OF THE PREFERRED EMBODIMENTS

Hereinafter, an embodiment of the present invention will be described in greater detail with reference to the drawings. However, the present invention should not be construed as being limited thereto.

Figure 1:
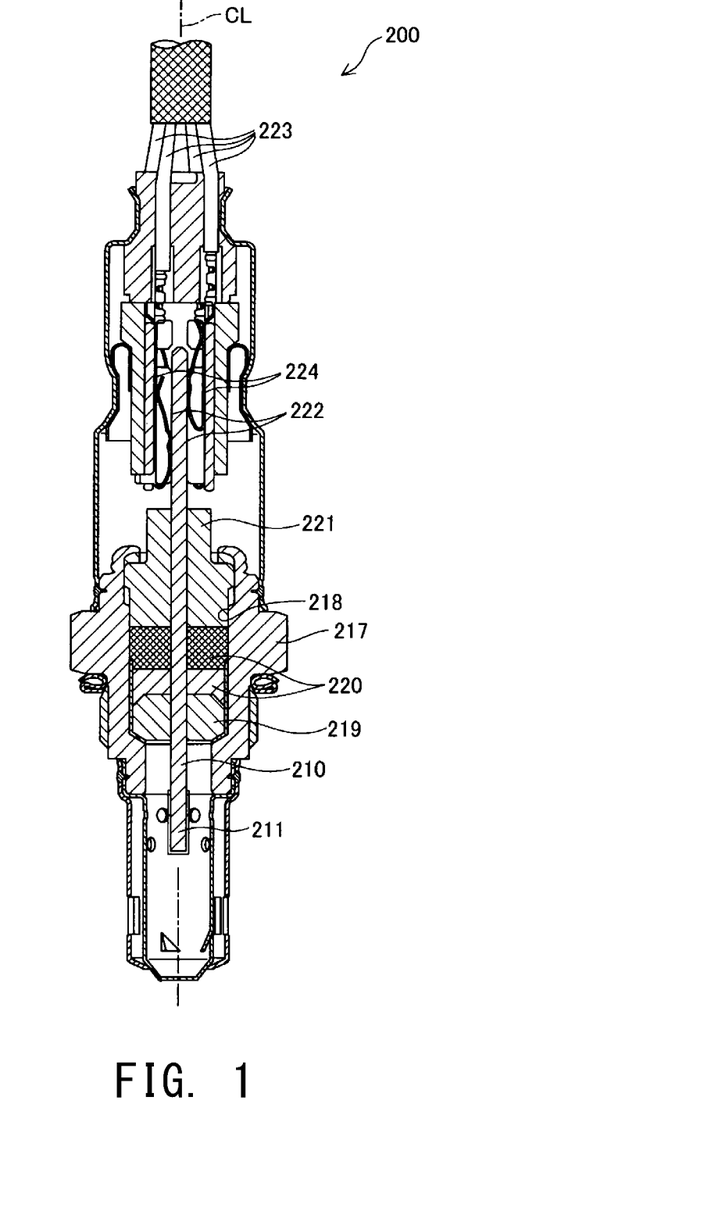
FIG. 1 is a cross-sectional view of a gas sensor including a gas sensor element according to an embodiment of the present invention, as seen along the axial direction thereof.
Figure 2:
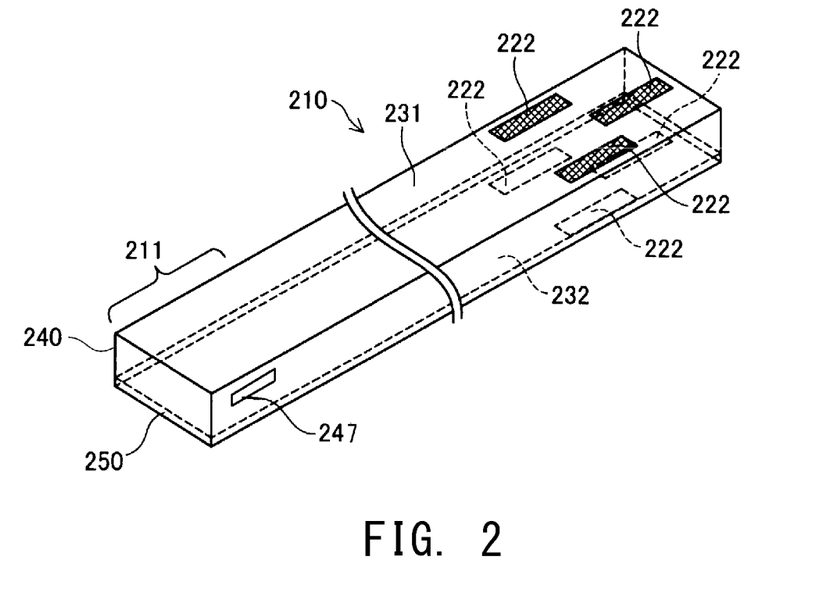
FIG. 2 is a perspective view of the gas sensor element according to the embodiment.
Figure 3:
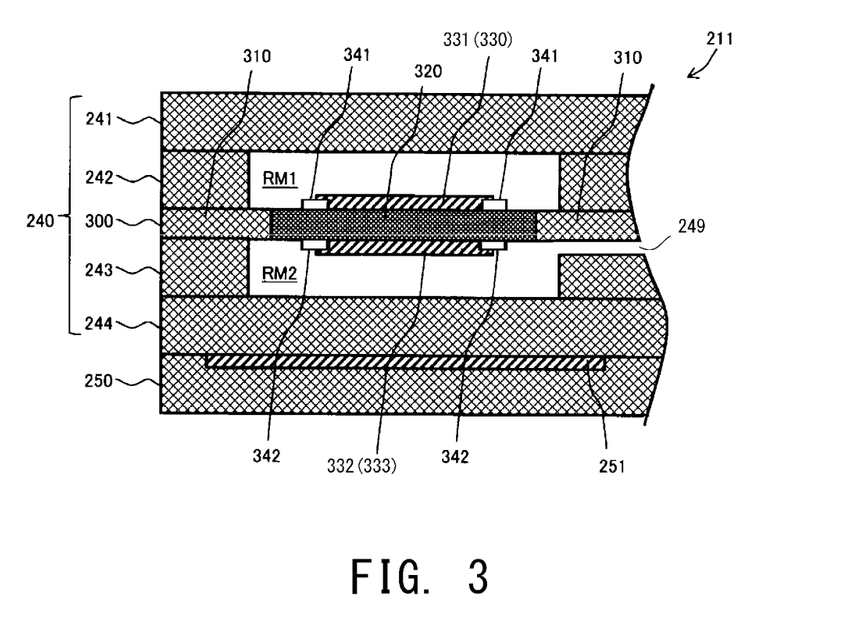
FIG. 3 is a cross-sectional view of the gas sensor element according to the embodiment, as seen along the axial direction thereof.
Figure 4:
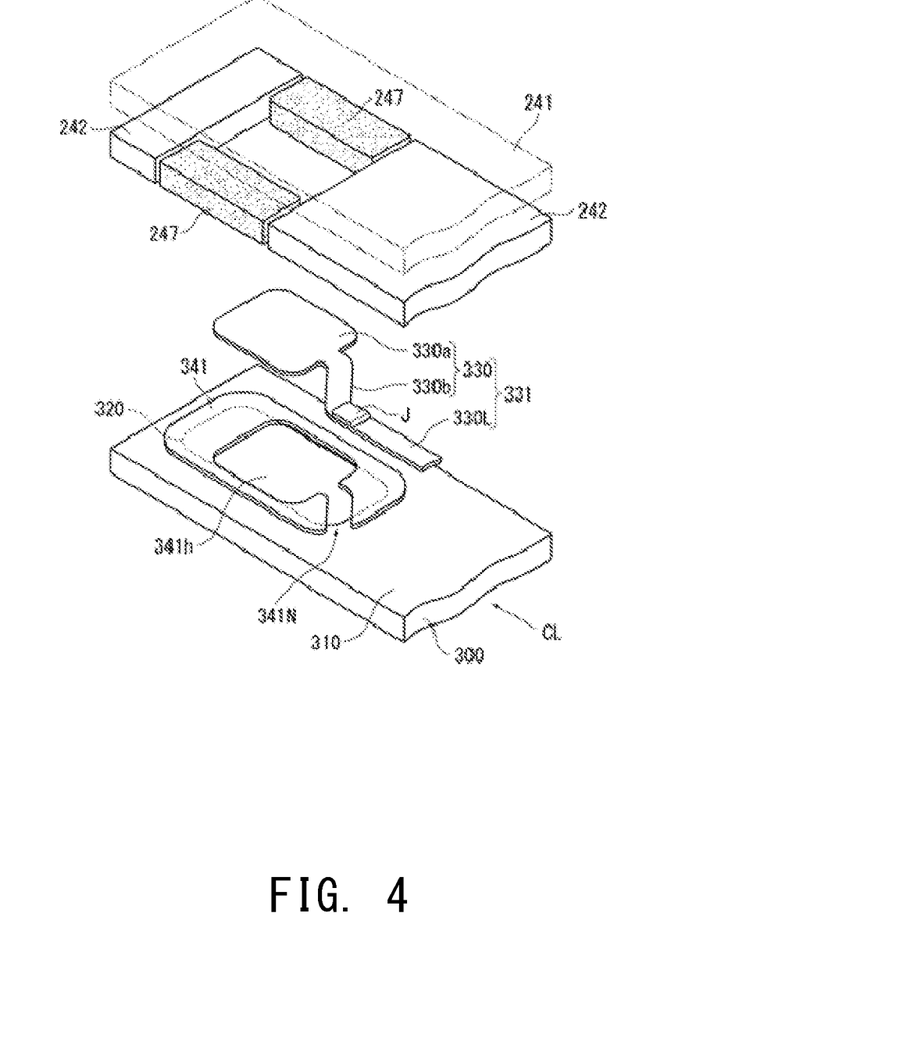
FIG. 4 is a partial exploded perspective view of the gas sensor element according to the embodiment.
Figure 5:
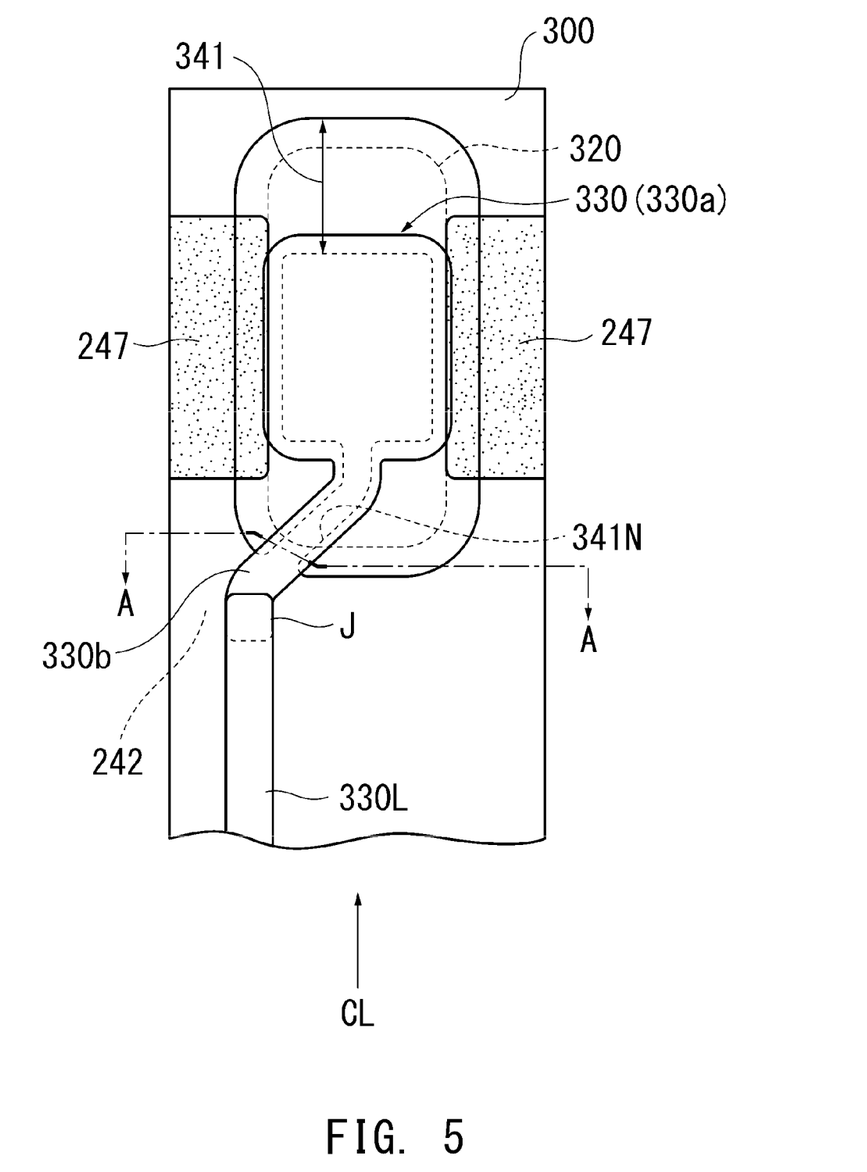
FIG. 5 is a partial plan view of the gas sensor element according to the embodiment.
Figure 6A:
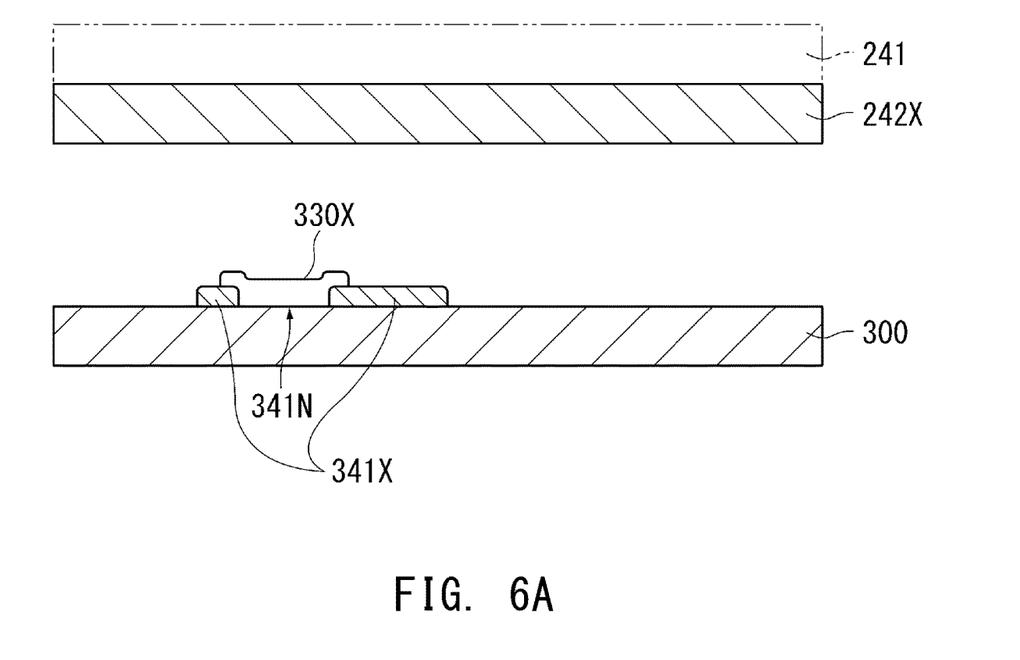
FIGS. 6A and 6B are views illustrating processes at a cross section taken along a line A-A in FIG. 5.
Figure 6B:
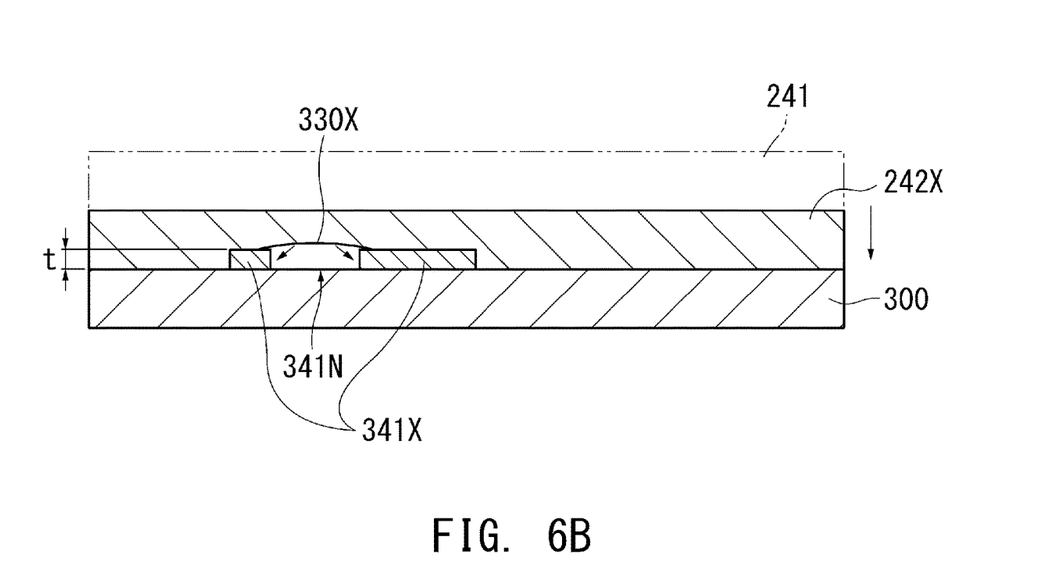

FIG. 1 is a cross-sectional view of a gas sensor 200 including a gas sensor element 210 according to an embodiment of the present invention, as seen along the axial direction CL. FIG. 2 is a perspective view of the gas sensor element 210. FIG. 3 is a cross-sectional view of the gas sensor element 210, as seen along the axial direction CL. FIG. 4 is a partial exploded perspective view of the gas sensor element 210. FIG. 5 is a partial plan view of the gas sensor element 210. FIGS. 6A and 6B are views illustrating processes at a cross section taken along a line A-A in FIG. 5.

In FIG. 1, the gas sensor 200 includes the gas sensor element 210 extending in the axial direction CL. The gas sensor element 210 is disposed in a through hole 218 of a metal shell 217 so as to penetrate a ceramic holder 219, talc regions 220 and a ceramic sleeve 221. A plurality of electrode pads 222 are provided on an outer surface on a rear side of the gas sensor element 210. These electrode pads 222 are in contact with connection terminals 224 so as to be electrically connected thereto, the connection terminals 224 being connected to a front side of lead wires 223 which in turn are connected to an external circuit (not shown). At a front end portion (a lower end portion in FIG. 1) of the gas sensor element 210, a gas detection portion 211 is provided having a solid electrolyte cell for measuring the concentration of a specific measurement target gas.

As shown in FIG. 2, the gas sensor element 210 is a stacked body obtained by stacking a plate-shaped detection element portion 240 and a plate-shaped heater 250. The gas detection portion 211 is arranged on the front side of the gas sensor element 210, and the plurality of electrode pads 222 are arranged on a first main surface 231 and a second main surface 232 on the rear side of the gas sensor element 210.

On opposed side surfaces of the gas sensor element 210, diffusion rate limiting layers 247 are respectively disposed so as to communicate with a first measurement chamber space RM1 which is described below and so as to introduce a measurement target gas into the first measurement chamber space RM1.

FIG. 3 is a partial cross-sectional view of the gas detection portion 211, as seen along the axial direction CL. The detection element portion 240 is formed by stacking: a first ceramic layer 300 including a solid electrolyte 320; and other ceramic plate-shaped bodies 241 to 244.

The heater 250 includes a conductive layer 251 which functions as a heater.

The first ceramic layer 300 includes: an insulation layer (e.g., an alumina substrate containing alumina as a main component) 310; and the solid electrolyte 320 inserted in a through hole provided in the alumina substrate 310. A first electrode 331 (electrode portion 330 thereof) and a second electrode 332 (electrode portion 333 thereof) are respectively provided on opposite surfaces of the solid electrolyte 320.

At the outer peripheral edge of the first electrode 331 (electrode portion 330), a support member 341 is provided so as to be located between the first electrode 331 (electrode portion 330) and the solid electrolyte 320. Similarly, at the outer peripheral edge of the second electrode 332 (electrode portion 333), a support member 342 is provided so as to be located between the second electrode 332 (electrode portion 330) and the solid electrolyte 320.

Measurement chamber spaces RM1 and RM2 are provided in the peripheries of the electrode portions 330 and 333 such that parts of the wall surfaces thereof are formed by the surfaces of the electrode portions 330 and 333, respectively. For example, a measurement target gas is introduced into the first measurement chamber space RM1 via the diffusion rate limiting layers 247 (FIG. 2), and atmospheric air is introduced as a reference gas into the second measurement chamber space RM2 via an air passage 249.

The solid electrolyte cell composed of the solid electrolyte 320 and the two electrodes 331 and 332 (electrode portions 330 and 333) can generate a voltage in accordance with the concentration of the measurement target gas in the first measurement chamber space RM1. A typical gas detection portion 211 has two or more solid electrolyte cells, but the gas detection portion 211 of the present embodiment is simplified and only one solid electrolyte cell is shown.

The ceramic plate-shaped bodies 241 to 244 and the insulation layer 310 are each formed from an alumina-based ceramic material containing alumina as a main component (more than 50 mass %). Examples of the alumina-based ceramic material include a composition containing 97 mass % of alumina ($Al_2O_3$) and containing 3 mass % of zirconia ($ZrO_2$).

The solid electrolyte 320 is preferably formed from a solid electrolyte material containing zirconia as a main component. Examples of the solid electrolyte material include a composition containing 80±5 mass % of zirconia ($ZrO_2$) and containing 20±5 mass % of alumina ($Al_2O_3$).

The electrodes 331 and 332 can each be formed by, for example, printing (e.g. through screen printing) and baking a conductive paste (platinum paste).

The diffusion rate limiting layers 247 can be formed by preparing a paste by mixing ceramic particles such as alumina particles and pore forming agents, and then sintering to burn out the pore forming agents.

The support members 341 and 342 are each formed from a ceramic material containing zirconia as a main material. In particular, if a material having a characteristic as a solid electrolyte is used as the material of the support member 341, 342, it is possible to secure a wider area of a portion that functions as the electrode portion, as compared to a case where the support member is formed from an insulative material. As the material having a solid electrolyte characteristic, a ceramic material containing zirconia as a main component and containing alumina as a minor component may be used, for example.

Next, the electrode portion 330 of the first electrode 331 and the support member 341 will be described with reference to FIG. 4 to FIGS. 6A and 6B. In the present embodiment, also as for the second electrode 332, the support member 342 is formed around the electrode portion 333. However, the configurations of the electrode portion 333 and the support member 342 are the same as those of the electrode portion 330 of the first electrode 331 and the support member 341, and thus the description thereof will be omitted.

As shown in FIG. 4, the first electrode 331 is composed of the electrode portion 330 and a lead portion 330L electrically connected to the electrode portion 330. The electrode portion 330 includes: a substantially rectangular electrode portion body 330a disposed on a surface of the solid electrolyte 320 and occupying a major area in which an electrode reaction occurs; and a thin-piece-like lead connection portion 330b extending outward in the axial line CL direction from one side of the electrode portion body 330a, the electrode portion body 330a and the lead connection portion 330b being integrated with each other.

The lead connection portion 330b straightly extends rearward from a center portion of the one side on the rear side of the electrode portion body 330a, then is bent in the width direction so as to have a shape of a crank, extends further straightly rearward and terminates. The front end of the lead portion 330L is connected to the terminal of the lead connection portion 330b so as to be superposed on the terminal, thereby forming a connection portion J. The lead portion 330L straightly extends rearward.

As used herein, the electrode portion 330 refers to a portion ranging up to a part that is integrally connected to the electrode portion body 330a disposed on the surface of the solid electrolyte 320 and that has the same composition as that of the electrode portion body 330a. In this example, the electrode portion body 330a and the lead connection portion 330b are each a porous body containing Pt as a main material. On the other hand, although containing Pt, the lead portion 330L has a lower porosity and is denser than the electrode portion body 330a and the lead connection portion 330b. Thus, the lead portion 330L does not have the same composition as that of each of the electrode portion body 330a and the lead connection portion 330b. Therefore, the electrode portion body 330a and the lead connection portion 330b are designated as the "electrode portion 330".

In this example, the lead connection portion 330b and the lead portion 330L forming the electrode portion 330 can be distinguished by visually observing their respective cross sections. As for the relative densities of the lead connection portion 330b and the lead portion 330L, for example, the weight proportions of conductive metals such as Pt of the lead connection portion 330b and the lead portion 330L are respectively obtained. The one having a higher weight proportion is determined to be the "denser" of the two.

The support member 341 has an outer peripheral edge having a substantially rectangular shape, and has a center portion cut out so as to have an opening 341h having substantially the same rectangular shape as that of the outer edge of the electrode portion 330. In addition, a notch 341N is formed by cutting the support member 341 such that a part of the opening 341h is connected to (communicates with) the outer peripheral edge of the support member 341. The notch 341N has substantially the same shape as that of the crank-shaped portion of the lead connection portion 330b.

The support member 341 is formed on the surface of the first ceramic layer 300 such that the opening 341h of the support member 341 is slightly smaller than the outer peripheral edge of the electrode portion 330. Further, the outer peripheral edge of the electrode portion 330 is superposed on the inner peripheral edge of the opening 341h. Similarly, the support member 341 is formed such that the outer peripheral edges of the lead connection portion 330b of the electrode portion 330 are superposed on the inner peripheral edges of cut notch 341N.

Figure 7:
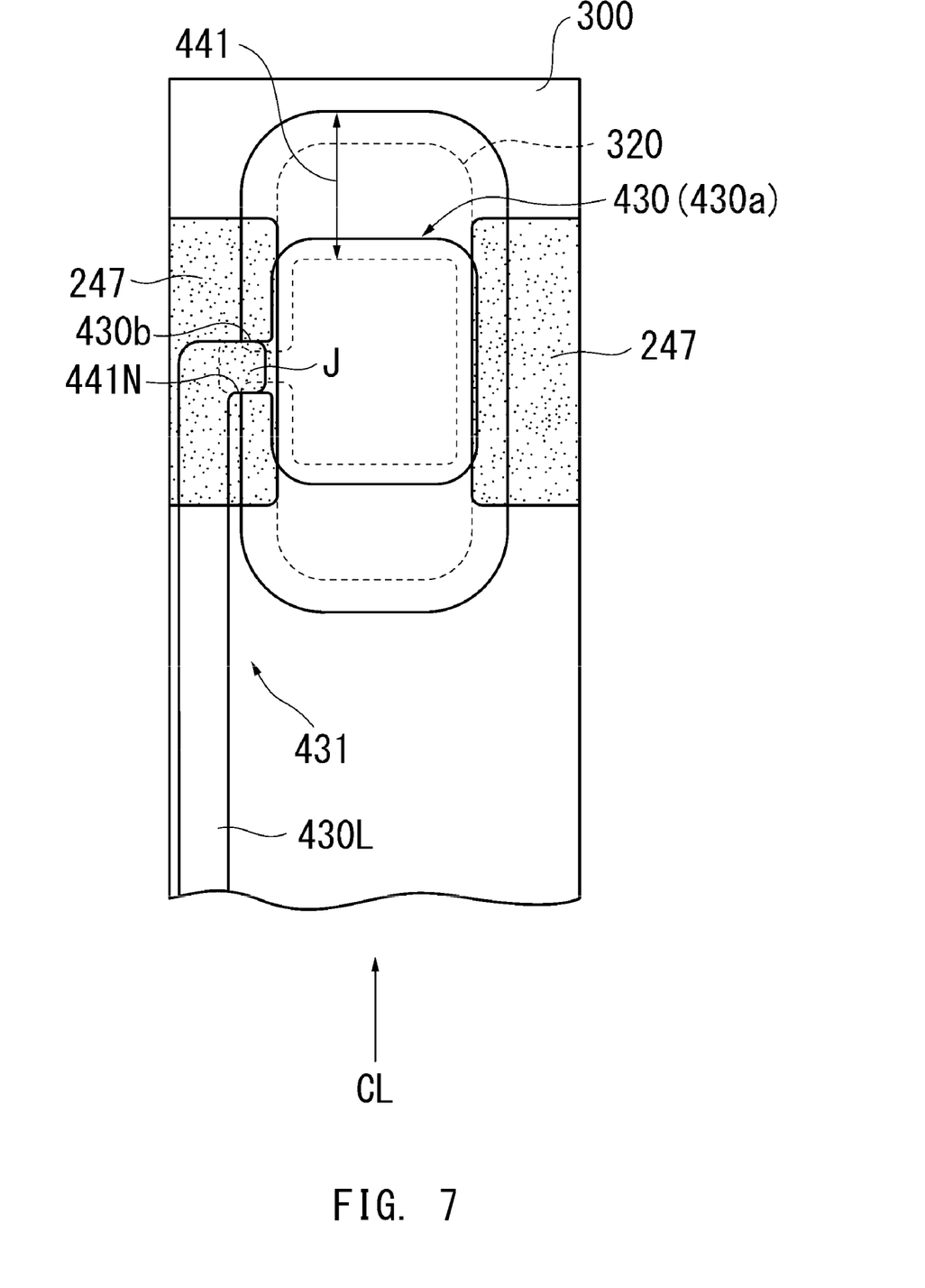
FIG. 7 is a partial plan view showing a modification of the gas sensor element according to the embodiment of the present invention.

Accordingly, the support member 341 surrounds the outer peripheral edge of the electrode portion 330, and the lead connection portion 330b which is a part of the electrode portion extends in the notch 341N. In this example, the lead connection portion 330b extends such that the terminal thereof is located outward of the notch 341N. However, as shown in FIG. 7 described below, the terminal of the lead connection portion 330b may be located within the notch 341N.

The diffusion rate limiting layers 247 and the ceramic plate-shaped bodies 242 are disposed on a side opposing the electrode portion 330 (upper side in FIG. 4). Further, the diffusion rate limiting layers 247 and the ceramic plate-shaped bodies 242 are disposed so as to be in contact with the surface of the support member 341. Of the two ceramic plate-shaped bodies 242, the rear-side ceramic plate-shaped body 242 covers a part of the notch 341N.

The diffusion rate limiting layers 247 and the ceramic plate-shaped bodies 242 correspond to the "second ceramic layer" of the invention.

The first ceramic layer 300 and the second ceramic layer (the diffusion rate limiting layers 247 and the ceramic plate-shaped bodies 242) are stacked as shown in FIGS. 6A and 6B, to thereby manufacture the gas sensor element 210.

First, as shown in FIG. 6A, an insulation paste layer 341X which is to become the support member 341 is formed by printing (or the like technique) a paste on a surface (upper surface in FIGS. 6A and 6B) of the first ceramic layer 300 formed from, for example, a green sheet. Then, a conductive paste layer 330X which is to become the electrode portion 330 is formed, by printing (or the like technique) a paste in an inner area (corresponding to the notch 341N) of the insulation paste layer 341X so as to be superposed on the inner peripheral edge of the insulation paste layer 341X.

The conductive paste layer 330X shown in FIGS. 6A and 6B corresponds to a portion which is to become the lead connection portion 330b after baking. Further, an area between two portions of the insulation paste layer 341X shown in FIGS. 6A and 6B corresponds to the notch 341N.

Meanwhile, insulation paste layers 242X which are to become the ceramic plate-shaped bodies 242 and porous paste layers to become the diffusion rate limiting layers 247 (not shown) are formed by printing (or the like technique) a paste on a surface (lower surface in FIGS. 6A and 6B) of the ceramic plate-shaped body 241 formed from, for example, a green sheet.

Next, as shown in FIG. 6B, the first ceramic layer 300 and the ceramic plate-shaped body 241 are stacked such that each insulation paste layer 242X comes into contact with the surface of the insulation paste layer 341X.

At this time, the insulation paste layer 242X covers the notch 341N of the insulation paste layer 341X. Further, the insulation paste layer 242X presses the conductive paste layer 330X disposed in the notch 341N and projecting from the insulation paste layer 341X, to thereby crush and stretch the conductive paste layer 330X (arrows in FIG. 6B).

However, the insulation paste layer 341X has a smaller metal content than the conductive paste layer 330X and is accordingly harder than the conductive paste layer 330X. Further, the insulation paste layer 341X which is harder than the conductive paste layer 330X serves as an obstruction to inhibit the conductive paste layer 330X from being further crushed. Thus, the thickness of the conductive paste layer 330X is prevented from becoming smaller than a thickness t of the insulation paste layer 341X. As a result, this configuration can inhibit the electrode portion 330 from becoming disconnected during manufacturing.

As described above, by providing the notch 341N, when the first ceramic layer 300 and the second ceramic layer 242 and 247 are stacked during manufacturing, the notch 341N provides an obstruction, and this configuration can inhibit the electrode portion 330 (lead connection portion 330b) in the notch 341N from becoming crushed and disconnected. In addition, in a state which inhibits the disconnection, the layers are stacked and the entirety of the resultant stacked body is baked, whereby the gas sensor element 210 can be manufactured.

In the present embodiment, the notch 341N is provided so as to avoid the diffusion rate limiting layers 247 of the second ceramic layer (so as to be located on the ceramic plate-shaped body 242 side).

For each diffusion rate limiting layer 247, a green-sheet-like hard material is sometimes used, and in this case, the diffusion rate limiting layer 247 is harder than the insulation paste layer 242X which is another member of the second ceramic layer. Therefore, by providing the notch 341N so as to avoid the diffusion rate limiting layer 247 (so as to be located on the side where the insulation paste layer 242X which is softer is present), the electrode portion 330 (conductive paste layer 330X) in the notch 341N becomes less likely to be crushed. Thus, this configuration can further inhibit the electrode portion 330 from becoming disconnected.

In addition, as shown in FIG. 4 and FIG. 5, in the present embodiment, the connection portion J between the electrode portion 330 (lead connection portion 330b) and the lead portion 330L is disposed outward of the outer peripheral edge of the solid electrolyte 320.

The lead portion 330L which is denser than the electrode portion 330 is different from the electrode portion 330 in terms of an electrode reaction with the solid electrolyte 320. Thus, if the connection portion J is disposed on the surface of the solid electrolyte 320, the electrode reaction between the electrode portion 330 and the solid electrolyte 320 is affected. Therefore, the connection portion J is preferably disposed outward of the solid electrolyte 320.

The gas sensor element 210 can be manufactured as follows, for example.

First, by screen printing or the like, pastes of the support members 341 and 342 are respectively pasted in frame-like outer peripheral edge regions, of opposed surfaces of the solid electrolyte 320 in an unbaked state, within which the outer peripheral edges of the electrode portion 330 and the like (the electrode portion of the electrode 332 is not shown) of the electrodes 331 and 332 are to be respectively included.

Next, conductive pastes of the electrode portion 330 and the like are pasted, by screen printing or the like, so as to be superposed on regions, of both surfaces of the unbaked solid electrolyte 320, that range from the inner sides of the support members 341 and 342 to the inner peripheral edges of the support members 341 and 342, respectively.

Next, conductive pastes of the lead portion 330L and the like to be connected to the electrode portion 330 and the like are pasted by screen printing or the like. Thereafter, the insulation paste layers 242X that are to become the ceramic plate-shaped bodies 242, a carbon paste for forming the first measurement chamber space RM1, porous paste layers that are to become the diffusion rate limiting layers 247, and the like are formed by pasting the respective paste layers on a surface of the ceramic plate-shaped body 241 formed from a green sheet. Then, the ceramic plate-shaped bodies 241 to 244 and the alumina substrate 310 which are in an unbaked state are stacked, and thereafter, the entirety of the resultant stacked body is baked, thereby forming the gas sensor element 210.

The present invention is not limited to the above-described embodiment, but is applicable to various modifications and equivalents encompassed in the idea and the scope of the present invention.

For example, although the electrode portion 330 (lead connection portion 330b) extends outward of the notch 341N in the above-described embodiment, an electrode portion 430 (lead connection portion 430b) may be located within a notch 441N, as shown in FIG. 7.

In the example in FIG. 7, in the electrode portion 430 including a first electrode 431, the lead connection portion 430b extends in the width direction from a center portion of one side at either of side ends of an electrode portion body 430a having a substantially rectangular shape, and terminates in the notch 441N of a support member 441. The front end of a lead portion 430L is connected to the terminal of the lead connection portion 430b so as to be superposed on the terminal, thereby forming the connection portion J. The lead portion 430L straightly extends rearward.

In addition, although the notch 341N is provided so as to avoid the diffusion rate limiting layer 247 in the above-described embodiment, the notch 441N is provided so as to overlap the diffusion rate limiting layer 247 in the example in FIG. 7.

Also in the example in FIG. 7, providing the notch 441N can inhibit the electrode portion 430 (lead connection portion 430*b*) in the notch 441N from becoming crushed and disconnected during manufacturing.

Figure 8:
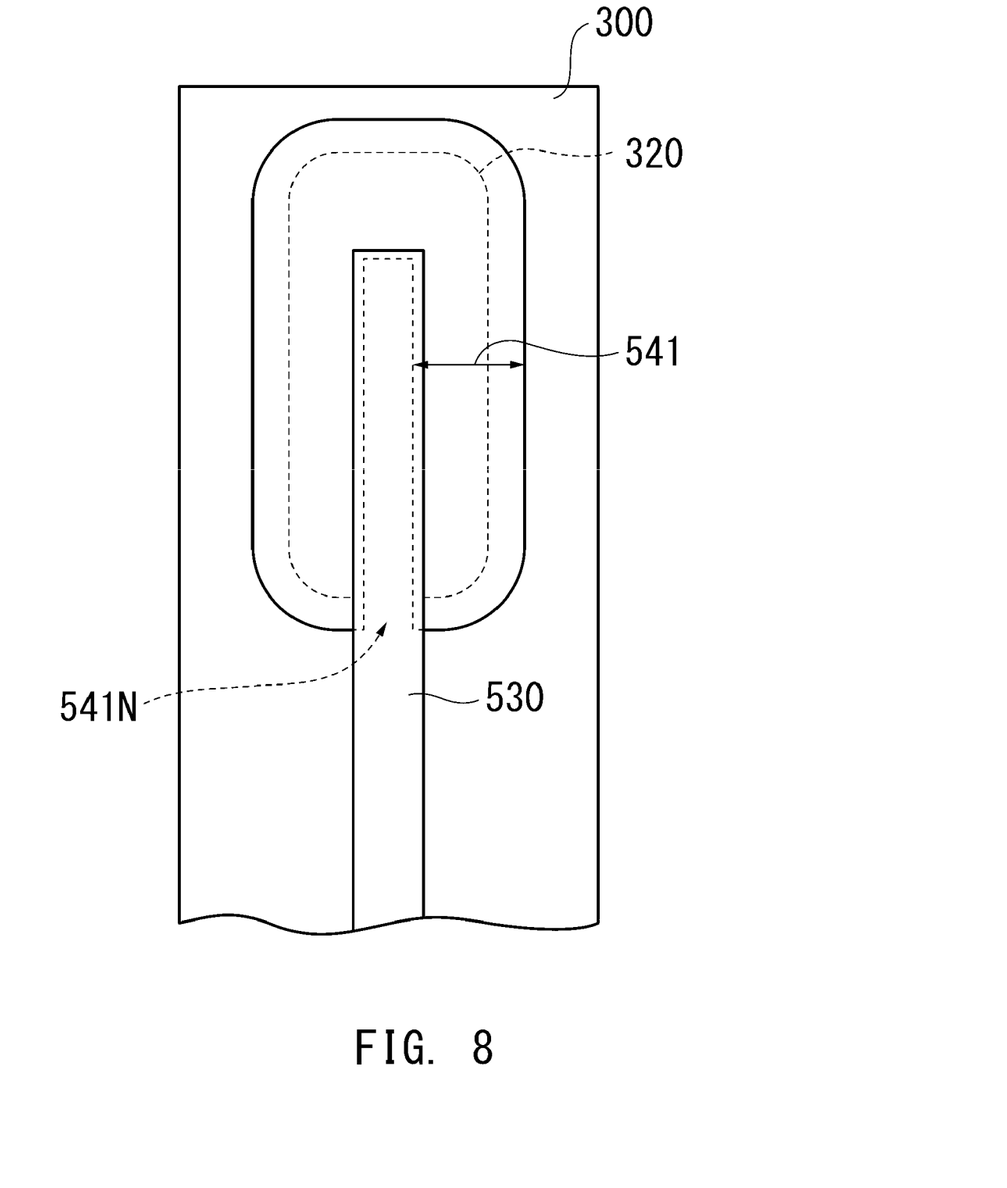
FIG. 8 is a partial plan view showing another modification of the gas sensor element according to the embodiment of the present invention.

Further, although the first electrode 331 is composed of the electrode portion 330 and the lead portion 330L in the above-described embodiment, an electrode portion 530 of the first electrode is not necessarily separate from the lead portion, but may be integrated therewith and may have the same dimension as that of the lead portion, as shown in FIG. 8. In this case, a notch 541N of a support member 541 may be provided at any portion that overlaps the electrode portion 530, but is preferably provided at, for example, a portion that is located outward of the outer peripheral edge of a solid electrolyte 320.

Although only the first electrode has been described in the examples in FIG. 7 and FIG. 8, the second electrode may have the same configuration, as a matter of course.

In addition, in the above-described embodiment, a case has been described where the support member is provided to each of the pair of electrode portions which are disposed on the surfaces of the solid electrolyte. However, the support member may be provided to only one of the pair of electrode portions.

Further, in the above-described embodiment, a detection cell for detecting the concentration of a specific gas in a measurement target gas is shown as an example of the cell including the solid electrolyte and the pair of electrode portions. However, the type of the cell is not particularly limited, and an oxygen pump cell or the like may be used as the cell, for example.

In addition, the material of the support member is not particularly limited. However, if a composition containing no metal or having a small metal-containing proportion (weight proportion) than the electrode portion is used as the material, the paste of the support member becomes harder than the paste of the electrode portion. Thus, when the first ceramic layer and the second ceramic layer are stacked during manufacturing, the notch of the support member becomes less likely to be compacted and the obstructive effect is increased, which configuration can further inhibit the electrode portion in the notch from becoming crushed and disconnected.

In addition, the present invention is not limited to a gas sensor element having the above-described configuration, but is applicable to gas sensor elements having various other configurations.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. JP 2018-024034 filed Feb. 14, 2018, incorporated herein by reference in its entirety.

The invention claimed is:

1. A gas sensor element comprising:
a first ceramic layer including a solid electrolyte;
a pair of electrode portions at least partially disposed on opposing surfaces of the solid electrolyte;
a support member surrounding a part of an outer peripheral edge of at least one electrode portion of the pair of electrode portions, the support member having an opening and a notch, the notch extending outwardly from the opening to a peripheral edge of the support member, and a part of the electrode portion extending in the notch; and
a second ceramic layer disposed on a side where the at least one electrode portion is present, so as to be in contact with a surface of the support member, the gas sensor element being obtained by stacking the first ceramic layer, the support member and the second ceramic layer, wherein
the second ceramic layer covers at least a part of the notch.

2. The gas sensor element as claimed in claim 1, wherein the second ceramic layer includes a diffusion rate limiting layer, and
the notch is provided so as to avoid the diffusion rate limiting layer.

3. The gas sensor element as claimed in claim 1, wherein the first ceramic layer is formed by disposing the solid electrolyte in a through hole provided in a plate-shaped insulation layer,
a lead portion which is denser than the electrode portion is electrically connected to each electrode portion, and
a connection portion between the electrode portion and the lead portion is disposed outward of an outer peripheral edge of the solid electrolyte.

4. The gas sensor element as claimed in claim 1, wherein the support member contains zirconia as a main material.

5. A gas sensor comprising the gas sensor element as claimed in claim 1.

6. The gas sensor element as claimed in claim 1, wherein the support member contains zirconia as a main component and alumina as a minor component.

7. The gas sensor element as claimed in claim 1, wherein the support member is made of a material having a characteristic as a solid electrolyte.

8. The gas sensor element as claimed in claim 1, wherein the support member is disposed between the solid electrolyte and the outer peripheral edge of the at least one electrode portion of the pair of electrode portions.

\* \* \* \* \*